UNITED STATES PATENT OFFICE.

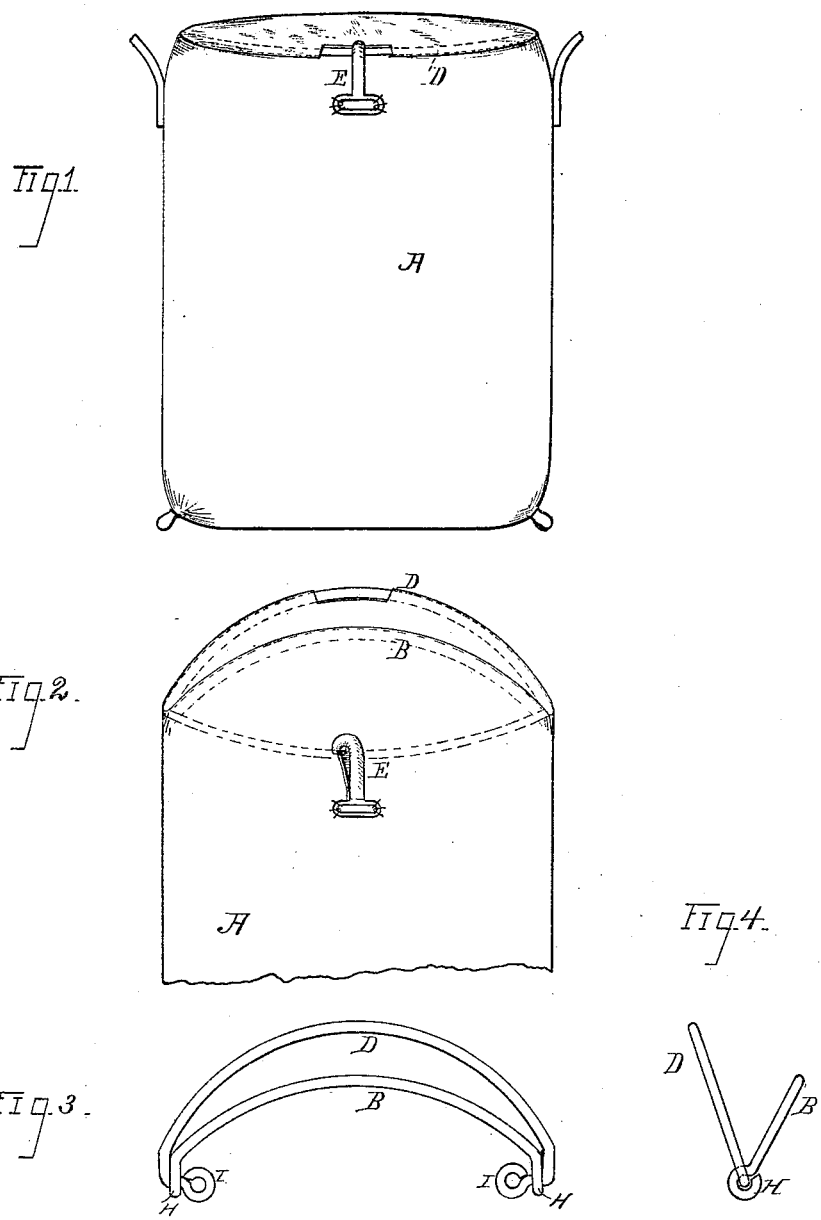

TIMBROOK SANDFORD, OF BROOKLYN, ASSIGNOR TO BRADLEY, KURTZ & CO., OF NEW YORK, N. Y.

BAG-FASTENER.

SPECIFICATION forming part of Letters Patent No. 252,804, dated January 24, 1882.

Application filed November 7, 1881. (No model.)

To all whom it may concern:

Be it known that I, TIMBROOK SANDFORD, of Brooklyn, in the county of Kings and State of New York, have invented a new and useful Improvement in Bag-Fasteners, of which the following is a specification, reference being had to the accompanying drawings.

The invention has relation to improvements in bag-fasteners; and it consists in a novel construction and arrangement of parts whereby the bag after being filled may be rapidly, securely, and economically closed and fastened.

The particular nature of the invention will be understood from the detailed description hereinafter presented, reference being had to the accompanying drawings, in which—

Figure 1 is a side elevation of a bag having its end closed by the fastener which is the subject of this application. Fig. 2 is a similar view of an open bag having the fastener attached. Fig. 3 is a side view of the bails detached from the bag, and Fig. 4 is an end view of same.

A indicates the bag, having at its upper end or mouth the bails B D, arranged on opposite sides thereof, the bails being secured together at their ends, so as to have a hinge like movement. The bails are preferably made semi-circular in form, and are of sufficient size to entirely encompass the sides of the bag, the ends of the bails meeting at opposite points on the bag. The pitch of the bail B is somewhat less than that of the bail D, whereby it is possible for the former, when in use, to pass beneath the bail D. Upon the side of the bag opposite to the bail D is secured a snap-hook or other suitable catch, E. The bails will preferably be secured to the mouth of the bag by sewing, and their application will be substantially that illustrated in the accompanying drawings. The bail B is provided at its ends with the eyes H, and the ends of the bail D are turned inward and passed through said eyes, after which they are formed into eyes I, thereby connecting the bails.

When in use the bag, after being filled with grain, is fastened by first pressing the bail B under the bail D and down upon the surface of the grain, after which the bail D is turned forward on the side of the bag opposite to the bail B and caught by the snap-hook E, as shown in Fig. 1.

The fastener which is the subject of this application is different from all other fasteners, in that the two bails inclose every part of the upper edge of the bag, and when open present a round, or nearly round, opening. When closed by being folded across each other they effectually fasten the opening and prevent the escape of the contents of the bag.

The bag and fastener herein described, while being adapted for various purposes, are specially applicable for use in shipping grain.

It has been found that by means of the fastener the bag may be roughly handled in the usual way without danger, and that much time and labor are saved in filling and transmitting the same.

In order to expedite the handling of the bag, I have attached to opposite sides of the same, at its upper ends, the tags. These may be modified as desired, the essential consideration being that the tag be of sufficient strength to withstand the strain.

While I greatly prefer to employ a snap-hook to catch the bail D, I do not limit myself to such use, as other varieties of hooks or catches might be employed with good results.

What I claim as my invention, and desire to secure by Letters Patent, is—

In combination with a bag, the fastener herein described, consisting of the bails B D, connected together at their ends so as to be capable of a hinge-like movement, one bail having a less pitch than the other, and the hook or catch adapted to secure the larger bail when the bails are closed, substantially as set forth.

In testimony that I claim the foregoing improvement in bag-fasteners, as above described, I have hereunto set my hand this 2d day of November, 1881.

TIMBROOK SANDFORD.

Witnesses:
CHAS. C. GILL,
HERMAN GUSTOW.